Patented May 31, 1949

2,472,052

UNITED STATES PATENT OFFICE 2,472,052

LIQUID SULFUR DYE COMPOSITION COMPRISING AN ALKYLOL AMINE

Robert Carland Conn, Bound Brook, N. J., assignor to American Cyanamid Company, New York, N. Y., a corporation of Maine No Drawing. Application March 29, 1946, Serial No. 658,233

4 Claims. (Cl. 8—37)

This invention relates to the preparation of stable solutions of sulfur dyes in organic solvents. More particularly, it relates to solutions of sulfur dyes in aliphatic alkylol amines having at least one amine hydrogen.

A serious problem has been presented by sulfur dyes in the past because these dyes in general have been insoluble in almost all solvents. It is true that some of them have slight solubility in concentrated sulfuric acid and a few high boiling organic materials, such as aniline and naphthalene. However, the solubility is so low that solutions of practical concentrations cannot be produced. As a result sulfur dyes have been dissolved in solutions of reducing agents, such as sulfides, hydrosulfides, polysulfides, and the like. These solutions have a number of drawbacks. For example, the solutions are not suitable for printing because the sulfides have a corroding action on metal printing plates and rolls.

The present invention is based on the discovery that stable dispersions of sulfur dyes can be made in aliphatic alkylol amines which have a free amine hydrogen, that is to say, primary or secondary amines. For practical purposes the amines should not contain more than five carbon atoms. Such solutions are stable and are capable of being prepared in either weak or concentrated form. They can be filtered readily and can be kept for relatively long periods of time. They are capable of being diluted with water in any proportion without precipitaton of the dyestuff and are also miscible with aqueous solutions of alkali metal hydroxides and sulfides. Neutralization with an acid or aeration, on the other hand, precipitates the dyestuff, as does also the addition of a concentrated aqueous salt solution or a miscible organic liquid, such as ethanol, ethylene glycol and the like.

The amines that have been found suitable for effecting solution include both monoethanol and diethanol amine, the propanol amines including 3-amino-propanol-1, 2-amino-propanol-1 and 1-amino-propanol-2, the butanol amines, such as 3-amino-butanol-1, 4-amino-butanol-2, 2-amino-butanol-1, and 1-amino-butanol-2, the pentanol amines, such as 5-amino-pentanol-1, 3-amino-pentanol-2, 2-amino-pentanol-3 and the like.

The sulfur dyestuffs dissolved include generally all those coloring matters made by heating organic materials with sulfur, alkali metal polysulfides, sulfur chloride and other thionating agents. Such dyestuffs are complex in nature and do not possess well-defined chemical structures. They are characterized by being soluble in aqueous solutions of sodium sulfide and by dyeing cotton and other cellulosic fibers directly from such a bath. As examples of such dyestuffs may be mentioned the yellow-to-orange shade dyes obtained by heating metal toluylene diamine with sulfur at elevated temperatures; the yellow shade dyestuffs derived by heating mono and diformyl meta-toluylene diamine, meta toluylene dithiourea, acet-ortho toluidide, dehydrothio para toluidine (or primuline) and benzidine, amino methyl benzimidazol, etc., with sulfur; khaki shade dyes made by heating para phenylene diamine, para amino acetanilid, benzidine and the like with sulfur; brown shade dyes made from such naturally occurring materials as sawdust, carbohydrates, tanning materials and tannery sludge, etc., as well as from intermediates like 1,8-dinitro naphthalene, 2,4-dinitro-4'-hydroxy-diphenylamine and dinitro xylol sulfonic acid; blue shade dyes made by refluxing 4-dimethylamino-4'-hydroxy diphenylamine, 4-phenyl amino-4'-hydroxy diphenylamine, 4,4'-dihydroxy diphenylamine and the indoaniline obtained by the condensation of para nitroso phenol with ortho toluidine, i. e.

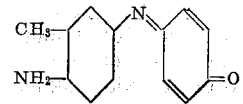

etc., with solutions of sodium polysulfide; black shade dyes made by similarly refluxing intermediates such as para nitro phenol, 2,4-dinitrophenol, picric acid, 2,4-dinitro-4'-hydroxy diphenylamine, carbazole indophenol, etc., with sodium polysulfide; bordeaux shade dyes made from the amino hydroxy phenazines obtained by the condensation of para nitrosophenol with meta toluylene diamine and its mono N-ethyl derivative; green shade dyes made from the leuco indophenols obtained by the condensation of para amino phenol with various amino naphthalene sulfonic acids, particularly 1-amino-6-naphthalene sulfonic acid, 1-phenyl amino-8-naphthalene sulfonic acid and 1-tolyl amino-8-naphthalene sulfonic acid.

The solutions of the sulfur dyes in the aliphatic alkylol amines are not necessarily true solutions. Some of them appear to be colloidal solutions, and therefore throughout the specification and claims they will be referred to more broadly as dispersions. For practical use it is not particularly material whether the dispersion is a true molecular dispersion as is the case in true solutions, or whether the dispersed particles are of a somewhat larger magnitude.

It is not desired to limit the present invention to a particular theory of action. The evidence, however, points to the strong probability that the sulfur dye is reduced when it forms the dispersion in the alkylol amine, the amine probably acting as a reducing agent for the disulfide and polysulfide linkages of the dye. The exact mechanism of the reaction has not been investigated to the point where definite knowledge is available of exactly what takes place. The reducing effect on analogous compounds has been shown by the fact that such compounds as 2-naphthyl-disulfide, 2-naphthyl-trisulfide, 2-naphthyl-tetrasulfide, and dibenzothiazyl disulfide are reduced by the alkylol amines to form two mols of the corresponding mercaptans.

Further evidence for reduction of the dyestuff lies in the fact that solutions of sulfur dyes in these organic amines can be diluted with water without precipitation; whereas the addition of an acid, or aeration of the dye solution, causes the dye to precipitate. The degree of reduction presumably varies since heating the dye with the amine at a low temperature, in some cases, produces a dispersion from which the dye may be precipitated merely by diluting with water. Likewise, dispersions which are not very stable may be produced by heating with a dilute, aqueous solution of the amine. In both cases, the stability of the dispersions may be improved by adding a caustic alkali such as sodium hydroxide and, in this case, it would appear that the alkali metal salt of the reduced dye is more stable and less subject to hydrolysis than the corresponding salt with the alkylol amine. It is probable that the degree of reduction has an important effect upon the particle size of the dye up to the point where true solution is obtained.

In the case of some dyes derived from indophenols, for example, sulfur navy blue (Color Index 959), reduction of the dyestuff appears to take place in two steps. In the first step, the dye dissolves without any change in color, usually by heating to 80°–100°. Presumably, only disulfide and polysulfide linkages are reduced. In the second step, which usually takes place about 100°, a tan or light brown colored solution is obtained which behaves as a true leuco solution. Aeration, or the addition of an oxidizing agent, readily regenerates color without precipitation of the dye. In this case, the quinoid form of the dye is apparently attacked and converted to the leuco form.

In preparing the liquid compositions of this invention, it is preferred to heat the dyestuff with the amine at a temperature of 80°–100°, although, in some cases, solution proceeds satisfactorily at room temperature. The preferred amount of solvent is from four to five times the weight of the dye, although there are cases where a smaller amount than this will be satisfactory. It is not necessary to use the dry, ground dyestuff for making the solution, although this works satisfactorily. It is more practical instead to use the wet dye press cake, since by so doing the expense of drying and grinding is eliminated. It is also more practical from a commercial point of view to use a combination of amine and caustic alkali in effecting solution, since by so doing the amount of the amine required is considerably reduced and a less expensive solution is obtained. Such solutions may be prepared either by heating the dye with the amine and then adding an aqueous solution of the alkali or by heating a mixture of the dye and amine in the presence of alkali and water. The first method produces a more stable solution, probably because reduction of the dyestuff is more complete. It is a characteristic feature of solutions of sulfur dyes in these amines that they will not dye cotton, etc., satisfactorily from an aqueous bath unless an alkali or an alkali metal sulfide is present. Those solutions in which no sulfide is present are particularly useful, since, in many cases, the usefulness of sulfur dyes has been limited by the necessity of using them in sulfide solution. For example, sulfur dyes have not been commonly used in printing (as distinguished from dyeing) because of the corrosive action of sulfides on the metal printing plates or rolls. It is a particular advantage of these amine solutions that no sulfide, or any other reducing agent, need be added and as such they may be used in printing or in other cases where the presence of sulfides, hydrosulfites, etc., would be objectionable.

It is an advantage of the present invention that it may also be used for the purification of the dyestuff. This is effected very easily by dissolving or dispersing the dyestuff in the alkylol amine, filtering, and reprecipitating, which latter step may be effected by neutralization with acid, aeration, treatment with concentrated salt solution, or dilution with ethanol or similar miscible organic solvents. The sulfur dyestuff thus purified is, of course, advantageously redispersed in alkylol amine to form the dispersions which will be actually used in further dyeing procedures.

The invention will be further illustrated by the following examples. It is intended that they be illustrative only and in no way limit the scope of the invention, which broadly includes solutions of all sulfur dyes in aliphatic, primary and secondary alkylol amines and alkylol diamines. The parts are by weight.

*Example 1*

100 parts of an unblended, solubilized sample of a commercial sulfur black dye prepared by refluxing a solution of sodium 2,4-dinitro phenolate with sodium polysulfide are stirred and heated at 100° C. with 100 parts of mono ethanolamine until solution is complete. The dyestuff dissolves completely and the resulting dark colored solution may be filtered or decanted to remove undissolved salt. The dyestuff remains in solution and, on cooling, does not separate.

*Example 2*

100 parts of a sulfur black press cake containing 65% solids prepared by refluxing a solution of sodium dinitro phenolate with sodium polysulfide, precipitating by acidification or aeration and filtering, are stirred and heated with 250 parts of mono ethanolamine. The dyestuff dissolves readily at a temperature of about 80° C. to give a stable solution. It is possible to reduce the quantity of mono ethanolamine to 200 parts or less, but the resulting solution is viscous and slow to filter. Dilution with water causes all of the separated salt to go into solution. If desired, an alkali, e. g., caustic soda may be added.

*Example 3*

600 parts of the same sulfur black press cake are stirred and heated at 100° C. with 150 parts of mono ethanolamine and 125 parts of a 50% solution of sodium hydroxide. Solution takes place within 30 minutes. A stable solution results which, upon dilution with water, dyes cotton directly without the addition of sodium sulfide or any other reducing agent.

*Example 4*

100 parts of an unblended sample of a commercial sulfur navy blue made by refluxing the indophenol derived from ortho toluidine and para nitroso phenol with sodium polysulfide (Color Index 959) is stirred and heated at 80° with 200 parts of mono ethanolamine until solution is complete. If inorganic salts are first removed from the dye, preferably by washing in the press cake form, a solution free from separated salt is obtained. However, the presence of salt does not interfere with the solution of the dyestuff, and any salt that separates may be easily removed by decanting or by filtering. Heating the solution to the boil reduces the dissolved dye to the leuco form. Aeration of the straw colored solution reoxidized the dye to the blue colored form without precipitating it from solution.

*Example 5*

100 parts of an unblended sample of a blue sulfur dye made by the thionation of para hydroxy - para' - dimethylamino diphenylamine (Color Index 959) are stirred and heated with 500 parts of mono ethanolamine at a temperature of 80°-90° C. until solution is complete. The resulting solution is stable and may be filtered if desired. Heating to the boil reduces the dyestuff in solution to the light colored leuco form. A similar solution is obtained by stirring and heating to 100° C. with the same quantity of diethanolamine.

The solution obtained by dissolving 100 parts of dye and 200 parts of mono ethanolamine at 70° C., when mixed with an aqueous solution of caustic soda and a suitable printing gum, produces bright blue prints upon cotton cloth.

*Example 6*

100 parts of a crude tan shade sulfur dye made by heating 2,4-diamino toluene with an excess of sulfur at 250° C. (Color Index 949) are stirred and heated at 100° C. with 500 parts of mono ethanolamine. A clear, dark colored solution results within 30 minutes. Removal of free sulfur from the crude dye by first extracting with hot xylene, carbon disulfide, warm dilute aqueous sodium hydroxide, etc., results in the production of a solution entirely free from dissolved sulfides.

The dyestuff can be reprecipitated from solution by aeration, or by the addition of an acid. The precipitated dyestuff behaves similarly to one precipitated from solution in aqueous sodium sulfide. It is readily soluble in cold aqueous sodium sulfide and is fairly soluble in cold mono ethanolamine. It is not soluble in cold 15% caustic soda but dissolves readily at the boil. The recovered dyestuff when dyed on cotton cloth from a sulfide bath produces a brighter shade dyeing than does the same dyestuff precipitated from sodium sulfide solution.

*Example 7*

100 parts of an unblended sample of a yellow shade sulfur dye, made by heating a mixture of primuline and benzidine with sulfur, are stirred with 400 parts of mono ethanolamine. The temperature is raised to 95°-100° C. and held there for about 30 minutes. A dark, reddish brown solution results, which may be filtered and used immediately or stored for future use. The solution may be used to print cotton cloth in the following way:

| | Parts |
|---|---|
| Sulfur dye solution in mono ethanolamine | 5.35 |
| Beta hydroxy ethyl ether of ethylene glycol | 3 |
| 50% caustic soda | 3 |
| Hot water | 23.65 |
| Printing gum | 71.0 |

This printing paste is made up and printed from an engraved copper roll. The finished print is aged for seven minutes and developed in a 1% sodium perborate solution (3 minutes at 130° F.), soaped for five minutes at the same temperature, rinsed and dried. A bright greenish yellow print is obtained. The copper roll is not corroded when the dye is printed in this way.

*Example 8*

The bordeaux shade sulfur dye (Color Index 1012) made by refluxing the following phenazine:

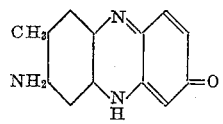

with a solution of sodium polysulfide is used. 100 parts of the dye are stirred with 800 parts of diethanolamine and heated. A satisfactory solution is obtained at a temperature of 95°-100° C. The resulting solution is stable to storage.

I claim:

1. A process of preparing a liquid sulfur dye composition which comprises heating a mixture of a mono-alkylol amine and a sulfur dye until said sulfur dye is reduced and a stable dispersion of the dye in said amine is formed, the said mono-alkylol amine having the following formula:

wherein R represents an alkylene group containing not more than 5 carbon atoms and the amount of said alkylol amine being sufficient to maintain the sulfur dye in reduced form, to dissolve said sulfur dye and to render the composition freely fluent.

2. The process of claim 1 wherein said mono-alkylol amine is mono-ethanol amine.

3. A liquid sulfur dye composition comprising a sulfur dye in reduced form dispersed in a mono-alkylol amine having the following formula:

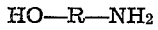

wherein R represents an alkylene group containing not more than 5 carbon atoms, the amount of said mono-alkylol amine present in said composition being sufficient to maintain the sulfur dye in reduced form, to dissolve the sulfur dye and to render the composition freely fluent and said liquid sulfur dye composition being obtained by the process of claim 1.

4. The composition of claim 3 wherein said mono-alkylol amine is mono-ethanol amine.

ROBERT CARLAND CONN.

REFERENCES CITED

The following references are of record in the file of this patent:

UNITED STATES PATENTS

| Number | Name | Date |
|---|---|---|
| 2,373,261 | Robinson | Apr. 10, 1945 |

FOREIGN PATENTS

| Number | Country | Date |
|---|---|---|
| 324,315 | Great Britain | Jan. 16, 1930 |
| 497,482 | Great Britain | Dec. 15, 1938 |